Dec. 25, 1956  J. T. YOUD  2,775,191

PRESS

Filed Feb. 8, 1954

INVENTOR

James Thomas Youd

BY Cameron, Kerkam & Sutton

ATTORNEYS

United States Patent Office 2,775,191
Patented Dec. 25, 1956

2,775,191

PRESS

James Thomas Youd, Honolulu, Territory of Hawaii, assignor to Hawaiian Pineapple Company, Limited, Honolulu, Territory of Hawaii, a corporation of Hawaii Application February 8, 1954, Serial No. 408,796

5 Claims. (Cl. 100—148)

The invention relates to improved presses for the extraction of juices from fruits, vegetables, and the like and more particularly to such presses in which an extension of the feed and extraction screw operating in the discharge orifice of the press prevents slippage in the press by assuring a positive feed of the cake.

Heretofore various types of screw fed presses have been proposed for extracting juices from fruits, vegetables and the like and it has also been proposed to utilize at the discharge end of such presses an adjustable cone which determines the length of time that the cake is retained in the press and the degree of extraction of the juices therefrom. In the extraction of juices from fibrous type fruits and vegetables such as pineapple difficulty has been experienced in obtaining the desired degree of juice extraction without blocking the passage of the cake past the adjustable cone with resultant press slippage and failure of the extraction of juices.

The present invention provides a mechanism for insuring the feeding of the cake past the cone no matter what the setting of the cone to obtain proper juice extraction without slippage of the press. This desirable result is obtained by securing to the lowest flight of the feed screw adjacent the adjustable cone a member which extends helically around the cone and has its lower and preferably pointed extremity adjacent the outlet end of the discharge passage. This helical member is spaced from the screw shaft and while it may feed the cake to some degree its principal action is to break up any compacting of the cake in the discharge passage around the cone so that the cake falls freely from the lower end of the press.

It is accordingly the object of the present invention to provide a novel mechanism secured to the screw feed of a juice extraction press which insures proper feeding of the cake therein by breaking up any compacting of the cake in the adjustable cone discharge orifice of the press.

The concept of the present invention is capable of various mechanical embodiments one of which is shown in the accompanying drawing and is described hereinafter for purposes of illustration. This illustrative embodiment should in no way be construed as defining or limiting the present invention and reference should be had to the appended claims to determine the scope of the same.

Figure 1:
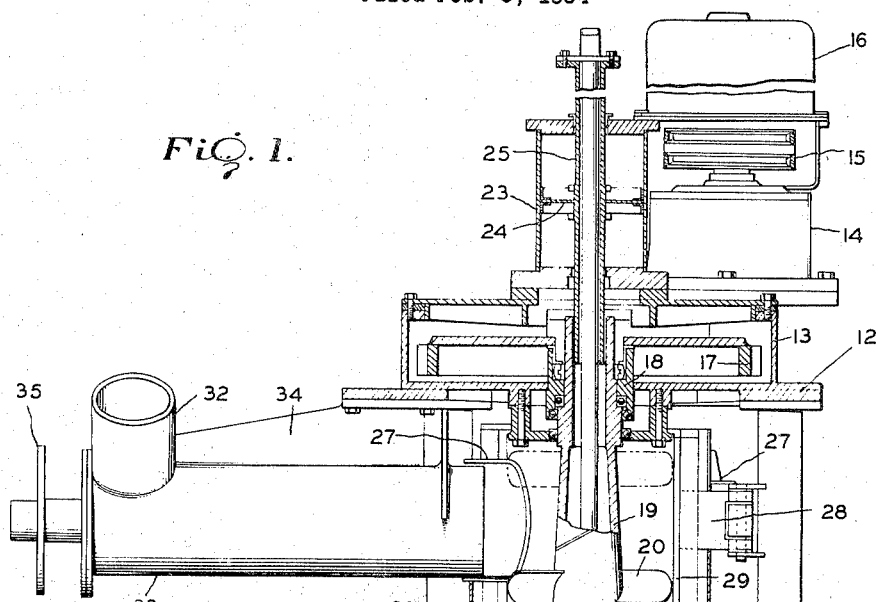
Figure 2:
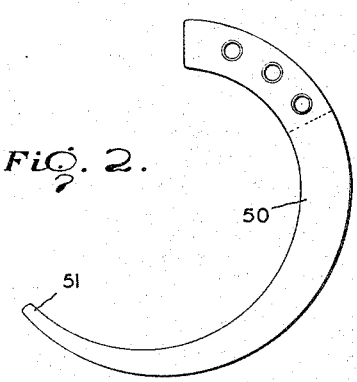
Figure 3:
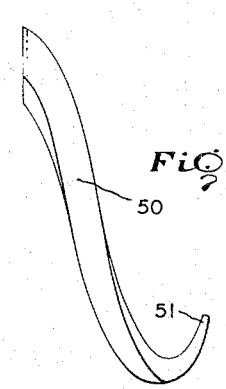

In the accompanying drawing, in which like reference characters indicate like parts, Fig. 1 is an elevation, partly in section, of a conventional screw type press having an embodiment of the present invention incorporated therein;

Fig. 2 is a view from above of the embodiment of the present invention shown in Fig. 1; and Fig. 3 is a view as seen from the left in Fig. 1 of the embodiment of the present invention shown therein.

Referring now to the drawing, a suitable base 10 is provided for the press having a plurality of uprights 11 mounted thereon which in turn support the press structure. Uprights 11 support a platform structure 12 which in turn mounts housings 13 and 14. Housing 14 contains suitable drive gearing, not shown, for the screw of the press which gearing is driven through a suitable belt drive generally indicated at 15 which belt drive is energized by any suitable source of power such as an electric motor 16. Housing 13 contains large drive gear 17 which is rotated by the mechanism above generally described and gear 17 rotates in a suitable bearing 18 mounted centrally in platform 12. Also mounted for rotation in bearing 18 and driven by gear 17 is a suitable hollow cone shaped screw shaft 19 which extends downwardly and centrally between uprights 11. Screw shaft 19 increases in diameter from its upper to its lower end and is provided with a plurality of screw flights 20 which are noncontinuous and are of the broken or interrupted type. A plurality of apertures 21 are provided in shaft 19 between the flights 20 of the screw and these apertures are closed by suitable screening 22.

A cylinder 23 is mounted centrally on housing 13 and piston 24 is mounted therein and is provided with a suitable piston rod 25 which extends downwardly through hollow shaft 19 for purposes which will be described more fully hereinafter. Motion of piston 24 and of piston rod 25 is secured by applying either pneumatic or hydraulic pressure to the desired side of piston 24 from sources not shown in the drawings.

A semicylindrical housing 26 is centrally secured within uprights 11 as by brackets 27 and a complementary semicylindrical housing is provided and is mounted on hinges 28 which are in turn secured to one of the uprights 11 so that when these two complementary housings are locked together the screw feed mechanism, above described, is completely enclosed in a fluid tight housing. Mounted within the housings 26 is a hollow cylinder 29 which is in close proximity to the screw flights 20 and is perforated to allow the passage of juices therethrough. Housing 29 is spaced from housing 26 to provide an annular passage 30 into which juices may pass for collection at spout 31.

The fruit or vegetables from which juice is to be extracted are admitted to the press through feed opening 32 which communicates with a hollow cylindrical feed screw housing 33 which is mounted beneath and secured to platform 12 by web 34. Housing 33 contains a feed screw, not shown, which is rotated by any suitable means generally indicated at 35. Housing 33 passes through housings 26 and 29 and opens adjacent the upper end of screw shaft 19. Thus the fruits or vegetables fed through housing 33 are discharged at the upper end of screw shaft 19 and are fed downwardly within housing 29 by screw flights 20 during the juice extraction process.

A hollow annular housing 36 is secured to supports 11 by brackets 37 and closes the lower extremities of housings 26 and 29. Housing 36 is provided with an annular slot 38 to receive the juices from chamber 30 and collects these juices in chamber 39 for discharge through spout 31, above identified. The inner surface 40 of housing 36 has a truncated conical shape to form an extension of housing 29 and discharge orifice of greater area for the press.

Slides 41 are carried on supports 11 and in turn mount webs 42 which support a hollow cone structure 43 which cooperates with conical surface 40 to provide an adjustable pressure cone for the press. Conical structure 43 is positioned by piston rod 25 which is suitably secured thereto as at 44 and is provided with an internal bearing surface 48 in which shaft 19 rotates. Juices passing into hollow screw shaft 19 are collected within hollow conical member 43 and are drawn therefrom by spout 46. The cake discharged from the press passes between surface 40 and conical member 43 in the annular discharge passage generally indicated at 47.

Pairs of breaker bars 48 may be mounted within housing 29 for cooperation with the screw flights 20 to insure proper pressing of the pulp from which juice is being extracted.

In presses of the type generally described above it has heretofore been found that with fibrous pulps clogging of the cake occurs in the discharge passage 47 between the adjustable cone 43 and surface 40 and when this clogging occurs the press slips, extraction of juices terminates, and the press must be shut down and cleaned. This difficulty may be overcome and the efficiency of the press greatly increased by securing to the lowest flight 20 of the feed screw a helically shaped member 50 which is spaced from screw shaft 19 and is shaped to move over but without contacting the inner lower surface of housing 29 and the surface 40 of member 47 during its rotation. Helical member 50 thus winds around the pressure cone 43 in a conical helix or non-planar spiral and rotates in the discharge passage 47 between and relative to the surface 40 and the surface of the cone 43. Said member 50 is preferably tapered toward its lower extremity and terminates in a reduced end point at 51. End point 51 is designed to rotate in the outlet of the discharge passage 47 between the lower extremity of surface 40 and the surface of the cone 43, said point or end being located preferably in the horizontal base plane of the outer conical surface 40 closely adjacent to said surface. Thus when screw shaft 19 is rotated helical member 50 is rotated counterclockwise as seen from above in Fig. 1 and the action of member 50 in passage 47 prevents clogging of the cake therein and insures the proper feed of the pulp through the press. This arrangement of member 50 permits positioning of conical member 43 as may be desired for proper extraction of the pulp without hindering the action of member 50.

It will now be apparent to those skilled in the art that the present invention in every way satisfies the object set out above.

Changes in or modifications to the above-described illustrative embodiment of this invention may now be suggested without departing from the present inventive concept and reference should be had to the appended claims to determine the scope thereof.

What is claimed is:

1. In a press having rotatable screw feeding and pressing means, a housing therefor provided with an outwardly flaring conical discharge orifice, and an axially adjustable, non-rotatable pressure cone mounted coaxially within said orifice and forming therewith a discharge passage of annular cross section having conical surfaces, means for preventing clogging of said passage including a non-planar spiral member connected with said screw feeding and pressing means for rotation therewith and having a portion spaced and extending therefrom into said discharge passage to move between and relative to its conical surfaces over said non-rotatable pressure cone.

2. A press as defined in claim 1, said screw feeding and pressing means comprising a shaft having screw flights mounted thereon and extending to a zone adjacent said discharge orifice, said non-planar spiral member extending axially beyond said flights and being radially spaced from the shaft axis and shaped to curve about said non-rotatable pressure cone.

3. A press as defined in claim 2, said helical member having one end connected to said shaft adjacent the end of said screw flights in said zone and extending freely therefrom with its other end close to and trailing over a conical surface of said discharge orifice.

4. A mechanism for preventing clogging in an annular outwardly flaring discharge passage formed between spaced coaxial outer and inner conical wall members at the outlet end of a screw type press, comprising a member having an outwardly flaring conical spiral shape extending in said passage and spaced from and winding over the inner conical wall member, means for mounting said spiral member at one end for rotation about an axis coaxial with said conical members and having its other end free and adjacent the outlet end of said passage, and means for rotating said spiral member relative to and between said conical wall members with said free end trailing around the annular outlet of said passage.

5. A mechanism as defined in claim 4, said free end being located substantially in the plane of the base of the cone defining the outer conical wall member and closely adjacent the surface thereof.

References Cited in the file of this patent

UNITED STATES PATENTS

| | | |
|---|---|---|
| 1,299,524 | Wertenbruch | Apr. 8, 1919 |
| 1,421,283 | Meakin | June 27, 1922 |
| 1,534,008 | Bongardt | Apr. 14, 1925 |
| 1,713,886 | Benzon | May 21, 1929 |
| 1,780,961 | Anderson | Nov. 11, 1930 |
| 2,340,009 | Meakin | Jan. 25, 1944 |

FOREIGN PATENTS

| | | |
|---|---|---|
| 106,141 | France | Nov. 26, 1874 |
| 560,184 | Germany | Sept. 29, 1932 |